United States Patent [19]

Schell

[11] Patent Number: 4,703,922

[45] Date of Patent: Nov. 3, 1987

[54] MECHANISM FOR RAISING, ROTATING AND LOWERING A PART

[75] Inventor: Gene P. Schell, Irving, Tex.

[73] Assignee: LTV Aerospace and Defense Company, Dallas, Tex.

[21] Appl. No.: 942,001

[22] Filed: Dec. 12, 1986

[51] Int. Cl.$^4$ .............................................. B23Q 1/04
[52] U.S. Cl. ........................................ 269/61; 269/66; 269/71
[58] Field of Search ............... 414/787, 628; 74/22 R, 74/23; 269/63, 60, 61, 66, 71, 58, 59

[56] References Cited

U.S. PATENT DOCUMENTS

| | | | |
|---|---|---|---|
| 4,014,439 | 3/1977 | Kochsiek et al. | 269/71 |
| 4,262,891 | 4/1981 | Kinney | 269/71 |
| 4,317,560 | 3/1982 | Troyer | 269/71 |
| 4,336,926 | 6/1982 | Inugaki et al. | 269/71 |
| 4,416,570 | 11/1983 | Argenbright | 269/71 |

Primary Examiner—Robert C. Watson
Attorney, Agent, or Firm—S. S. Sadacca; J. M. Cate

[57] ABSTRACT

A mechanism for raising, rotating and lowering a workpiece from a first secured position to a second secured position with only a rotational input, wherein work operations may be performed on said workpiece in the first and second secured positions, includes dual cam followers extending from the first end of the workpiece for engaging dual camming races to allow the workpiece to first be raised, then rotated and then lowered to a second position. A ball bushing is mounted on the opposite end of the workpiece and pivots in a bushing support to permit the workpiece to rotate about its elongate axis. In an alternative embodiment, two sets of cam followers are provided, one set being mounted at the first end of the workpiece and other set mounted at the opposite end. Both sets of cam followers engage separate dual camming races to rotate the workpiece from a first secured position to a second secured position while remaining in a horizontal position. In a third embodiment, a cradle is provided to hold the workpiece during raising, rotating, and lowering of the workpiece.

31 Claims, 12 Drawing Figures

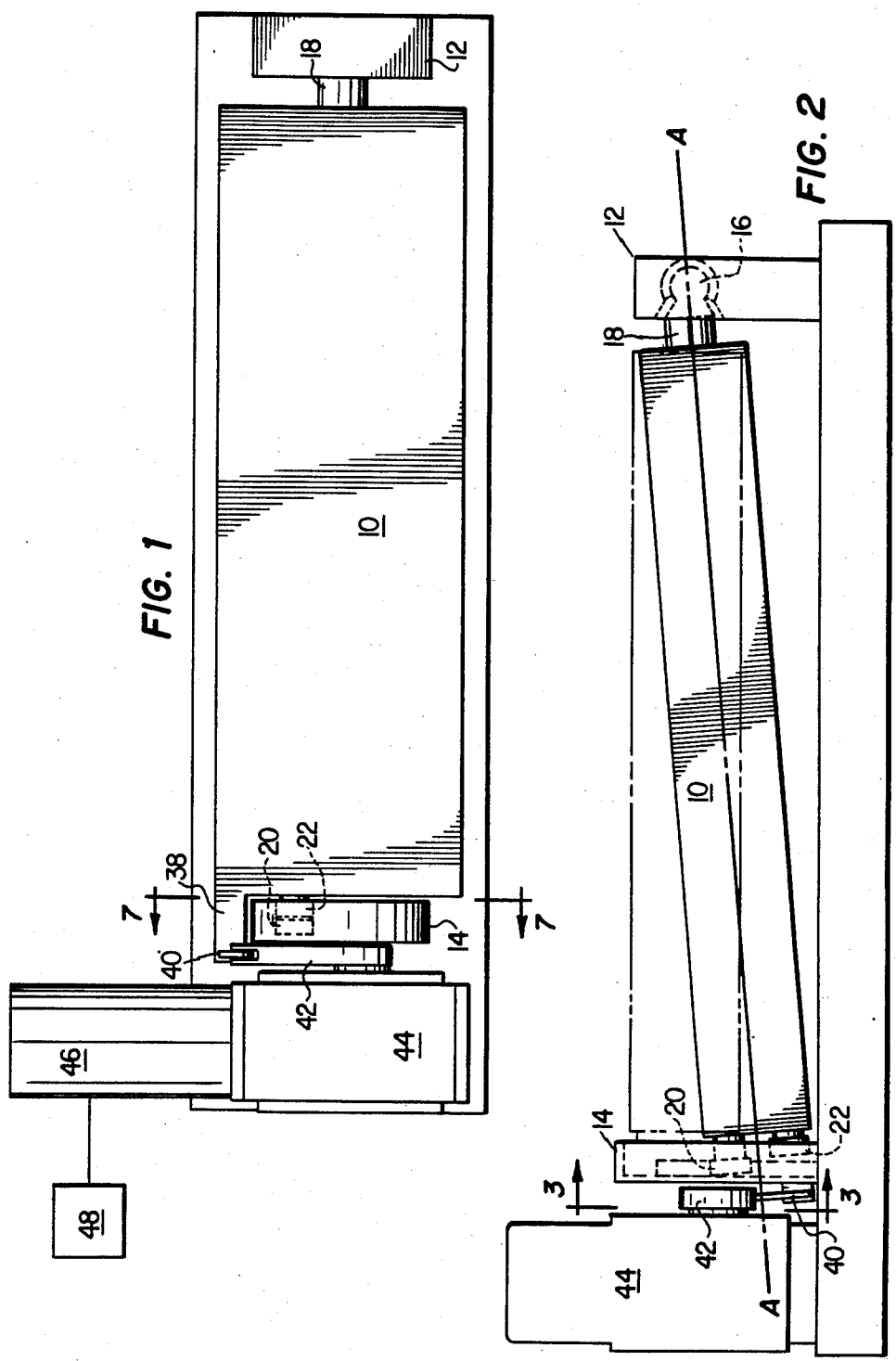

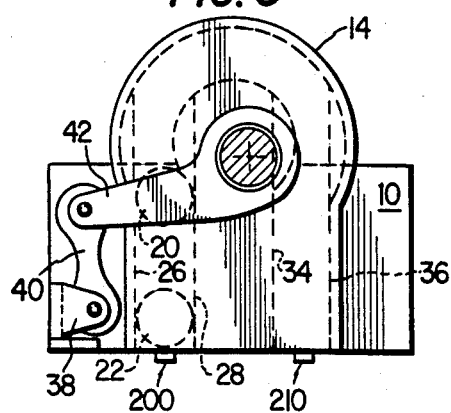
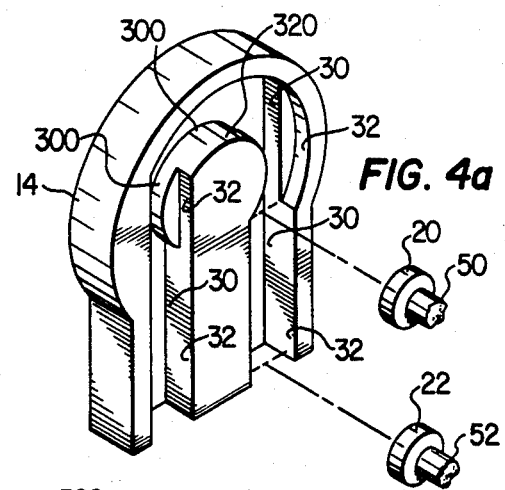
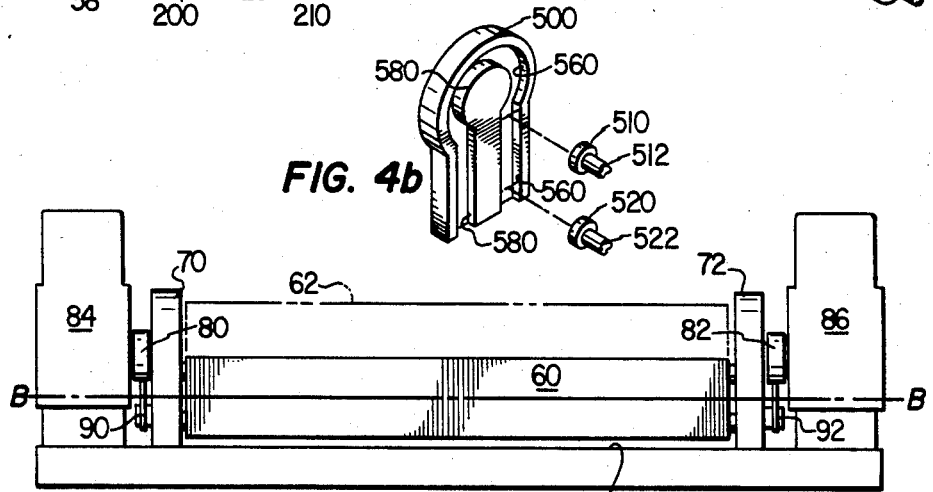
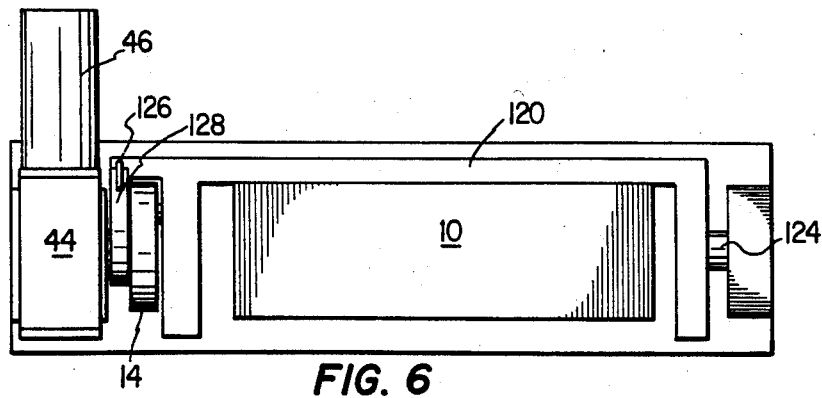

MECHANISM FOR RAISING, ROTATING AND LOWERING A PART

TECHNICAL FIELD

The present invention relates to a mechanism for raising, rotating and lowering a part relative to a work surface and for securing said part during work operations thereon.

BACKGROUND ART

Indexing apparatus of various types have long been in use in conjunction with various types of manufacturing and assembly operations in order to advance workpieces between work stations as well as into and out of various types of machinery. Numerous types of drive systems have been developed over the years to accomplish this work transfer operation in a rapid and efficient manner. Typically, such drive systems have employed different combinations of barrel cams, bell cranks, lever arms, or scotch yoke connections and the like.

It is highly desirable to provide drive systems for such indexing apparatus which are able to smoothly move a workpiece through various work positions without subjecting either the workpiece or the associated apparatus to shocks or jerk resulting from sudden acceleration or deceleration from or to a stationary position. This is particularly important with regard to an apparatus which is designed for use in assembly operations wherein sudden movements may dislodge parts being assembled. Additionally, it is desirable to avoid abrupt movements in all cases because of the adverse effect which may result from subjecting the entire apparatus and workpiece to the stress and strain associated with such movements.

In addition to reducing or eliminating abrupt movement in such indexing apparatus, it is also desirable to design an apparatus to be able to reciprocate the workpiece into and out of various work positions as rapidly as possible. Also, to avoid successive down time as well as high maintenance costs, it is highly desirable to design such apparatus as simply as possible with a minimum number of moving parts. Coupled with a desire to maintain the design as simple as possible while still accommodating the other operational aspects required is the desirability of enabling the apparatus to be easily fabricated at a relatively low cost without sacrificing reliability. While previous indexing drive arrangements have been able to achieve differing measures of success in meeting the above objectives, none of them have been totally effective in providing a completely acceptable drive assembly that can secure a workpiece to allow work operations to be performed thereon at any point in its travel.

Consequently, a need exists for a substantially improved drive system which utilizes a cam and cam follower arrangements specifically designed to provide extremely smooth movement of a workpiece. Furthermore, a need exists for an apparatus which, while providing means to move said workpiece, also provides means to hold said workpiece in a secure position so that work may be performed thereon in any position the workpiece assumes during its travel. Likewise, a need exists for an indexing apparatus, which while providing first and second work positions for a workpiece, also provides various other work positions where access may be had to any surface of the workpiece, while simultaneously securing the workpiece to allow work operations to be performed thereon. Yet a further need exists for a user operated indexing apparatus that can be preprogrammed to halt the travel of the workpiece at any predetermined point to allow work operations to be performed thereon.

SUMMARY OF THE INVENTION

The present invention provides a mechanism for raising, rotating and lowering a part relative to a work surface while allowing the travel of the workpiece to be interrupted and work to be performed at any raised, rotated, or lowered point. Specifically, a part or workpiece is rotatably attached to a crank arm and link mechanism, and the movement of one end of the part is controlled by dual cam followers extending from the part and engaging two camming races so that rotation of the crank arm initially causes the part to move to a raised position, then rotate about its elongate axis, and then return to a lowered position. More particularly, the camming races comprise dual camming surfaces sized so as to slidably receive cam followers and restrict the followers from lateral movement within said races to secure the workpiece in its initial position to allow work to be performed thereon. Furthermore, the camming races, cam followers, and crank arm and link mechanism cooperate to secure the workpiece at any point in its travel to allow work operations to be performed thereon.

In one embodiment, the part is engaged at its first end to dual camming races by dual cam followers extending from the part. The cam followers secure the part from moving horizontally as work operations are performed on the part, but allow the part to be raised vertically, rotated, and lowered. A ball bushing located on an elevated support is positioned at the second end of the part and secures this end in a fixed position during work operations on the part. The attachment, however, allows free rotation of the part about its elongate axis and allows the elongate axis to change its angle of inclination with respect to the horizontal. Further, in an alternative embodiment, the part is engaged at its first end to a single camming race by dual cam followers extending from the part. A single camming race is used to secure the part from moving horizontally as work operations are performed on the part, but to allow the part to be raised vertically, rotated, and lowered.

In an alternative embodiment, the first and second ends of the part each have dual cam followers which engage dual camming elements to secure the workpiece in the horizontal plane during work operations and allow the piece to be raised, rotated, and lowered so that its elongate axis remains substantially parallel to the horizontal plane during all movements. In yet a further embodiment, the workpiece is mounted in a cradle, wherein the first end of the cradle has dual cam followers engaging dual camming races to permit the cradle to be raised, rotated and lowered. A ball bushing located on an elevated support is mounted on the second end of the cradle to secure the second end in a fixed position during work operations, but allows free rotation of the part about its elongate axis.

The present invention further contemplates a crank means rotatably attached to said workpiece including a crank arm, gearing mechanism, and drive means, wherein said drive means is user controlled and can halt the movement of the workpiece in any position of rotation to allow work to be performed thereon. Further, the control means also can be preprogrammed to halt the rotation of the workpiece at a predetermined position to allow work to be performed thereon, and has means to detect when the workpiece has reached its fully lowered position and halt its travel at that point. In one embodiment, the drive means comprises an electric motor, but the present invention also contemplates the use of other motors, such as, for example, pneumatic and hydraulic drive systems.

BRIEF DESCRIPTION OF THE DRAWINGS

A more complete understanding of the invention and its advantages will be apparent from the Detailed Description taken in conjunction with the accompanying Drawings, in which:

FIG. 1 is a top view of the apparatus of the present invention;

FIG. 2 is a front view of the apparatus of FIG. 1;

FIG. 3 is a sectional view along line 3—3 of FIG. 2;

FIG. 4a is a perspective view of a camming surface and cam followers of the present invention;

FIG. 4b is a perspective view of a camming surface and cam followers in an alternative embodiment of the present invention;

FIG. 5 is a front view of an alternative embodiment of the apparatus of the present invention;

FIG. 6 is a top view of the apparatus of FIG. 5;

DETAILED DESCRIPTION

Figure 7:
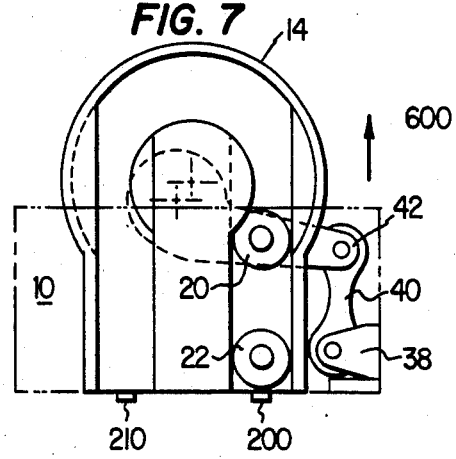
FIG. 7 is a sectional view along line 7—7 of FIG. 1 showing a workpiece in a lowered position.

In accordance with the present invention, a mechanism is provided whereby a workpiece is secured during work operations thereon and can be raised to an elevated position, then rotated, and subsequently lowered and returned to a secured position for continued work operations thereon. The present invention further contemplates means to halt the movement of said workpiece in any raised, rotated, or lowered position, and to secure said workpiece in said position to allow work to be performed thereon.

Referring now to FIGS. 1 through 4a, a workpiece 10 is mounted between a ball bushing support 12 and a camming element 14. Specifically, camming element 14 has dual camming races 30 and 32 defining inner and outer tracks, respectively. Dual cam followers 20 and 22 are attached at one end of workpiece 10 and secure the workpiece in the horizontal plane by engaging dual camming races 30 and 32 located within camming element 14. Bushing support 12 has an elevated spherical socket for pivotally receiving a ball bushing 16 attached to workpiece 10 by shaft 18. In an alternative embodiment (not shown), the elevation of ball bushing support 12 may be adjusted to increase or decrease the angle of inclination of the workpiece in its rest position according to the geometry of the workpiece or whether it is desired that the workpiece be inclined in its lowest rest position and horizontal during rotation, or vice versa.

As shown in FIG. 3, camming races 30 and 32 share common boundaries 26, 28, 34 and 36 in the lower portion of camming element 14, these boundaries sized to receive cam followers 20 and 22 for slidable engagement therein and to prevent lateral movement of the followers in the horizontal plane. Link 40 and crank arm 42 are attached to workpiece 10 by extension 38. By rotating crank arm 42, link 40 is raised to lift workpiece 10 to a raised position. As shown in FIG. 4a, camming races 30 and 32 do not share common boundaries in the upper portion of camming element 14, except at the element's uppermost portion. In particular, race 30 has arcuate portion 300 proximate race 32, and race 32 has a corresponding arcuate portion 320 proximate race 30 (not shown). At the uppermost portion of element 42 arcuate races 300 and 320 share a common boundary.

Crank arm 42 is driven by electric motor assembly 46 through gear mechanism 44 which, in the preferred embodiment, is a worm gear assembly. The motor assembly is controlled by a programmable controller 48. Through such controller, motor assembly 46 can be operated at various speeds in both the forward and reverse directions. Controller 48 also provides an on-off control mechanism which is user operated and can be preprogrammed to stop the movement of the workpiece at any position and has means to detect when the workpiece reaches the lowest point of its travel and halts its movement at that point.

In a preferred embodiment, as shown in FIGS. 3, 7, 8, 9, 10 and 11, contact switches 200 and 210 are located at the base of camming element 14 in the path of cam followers 22 and 20, respectively. These contact switches serve as means to detect when the workpiece reaches the lowest point of its travel, and are electrically connected to controller 48 in such a manner that controller 48 will stop the movement of the workpiece when cam follower 22 contacts switch 200, or cam follower 20 contacts switch 210. It will be understood that switches 200 and 210 may also be located at any position on camming races 30 and 32, respectively, and may comprise hydraulic or pneumatic switches or could be located so as to contact workpiece 10, for example. Gear mechanism 44, crank arm 42, link 40, and extension 38 cooperate to restrict movement of the workpiece in the vertical plane while motor 46 is not in operation by gear meachanism 44 prohibiting the rotation of arm 42 when motor 46 is not in operation.

When the workpiece is in its lowered position, its elongate axis, defined in FIG. 2 by line A—A, is inclined so that the dual cam followers 20 and 22 are in a position lower than ball bushing 16. Cam follower 20 is located in the camming element so that it follows the innermost camming race 30, and cam follower 22 is located so as to engage the outer camming race 32.

Referring now to FIG. 4a, cam follower 20 is mounted on shaft 50, and cam follower 22 is mounted on shaft 52, both extending from workpiece 10. Shaft 50 is of sufficient length such that cam follower 20 engages inner camming races 30 and 300, and shaft 52 is of sufficient length such that cam follower 22 engages outer camming races 32 and 320. As seen in FIGS. 1 through 4a, cam followers 20 and 22 are mounted in a staggered configuration, and follow separate paths on camming races 30 and 32 during operation. Further, the size of cam followers 20 and 22 and camming races 30 and 300, and 32 and 320 are such that the cam followers may be canted with respect to the camming races while workpiece 10 is at rest at an inclined angle as shown in FIG. 2. Likewise, link 40 attached between extension 38 and crank arm 42 is attached to both extension 38 and crank arm 42 so that it may be similarly canted with respect to workpiece 10 while the workpiece is at rest at an inclined angle.

It will be further understood that in yet other alternative embodiments, crank arm 42 can be driven by pneumatic or hydraulic means, for instance, through gear mechanism 44. The drive means may be controlled in both forward and reverse directions by a programmable control means which can halt the movement of the workpiece at any preselected point. This system includes an on-off switch and means for detecting when the workpiece reaches its lowest position and for halting its travel at that point.

Referring to FIG. 4b, in an alternative embodiment of the present invention, camming element 500 has but a single camming race defined by surfaces 560 and 580. Surfaces 560 and 580 are spaced so as to receive cam followers 510 and 520, which followers are located in a single plane and are mounted on shafts 512 and 522, respectively. It will be understood that camming element 500 may be used in the same manner as is camming element 14, and may be used with the same combination of parts and elements as is camming element 14 so as to facilitate and accomplish the raising, rotating, and lowering of a workpiece.

Referring now to FIG. 5, in an alternative embodiment of the present invention, workpiece 60 has dual cam followers mounted at either end (not shown), wherein one set of cam followers engages a first camming element 70 and the other set of cam followers engages a second camming element 72. Dual crank arms 80 and 82 are attached to said workpiece by links 90 and 92 in a manner similar to that shown in FIGS. 1 and 2. Crank arms 80 and 82 are driven by reversible motor and gear units 84 and 86, respectively. These dual reversible motor and gear units are operated by a single control means comprising on-off and reverse switches in a manner so that crank arms 80 and 82 are driven in unison at substantially identical speeds in the same direction. It will be further understood that the control means is user operated and may be programmable to stop the travel of workpiece 60 at a predetermined position to allow work to be performed thereon, and likewise, can detect the workpiece in its lowest position and halt its travel at that point. Camming elements 70 and 72 are similar to camming element 14 shown in FIG. 4a. Likewise, each set of dual cam followers is arranged in a staggered fashion so that one cam follower at each end follows the inner race of the camming element, and the other cam follower follows the outer race of the camming element. It will be understood that in an alternative embodiment (not shown) that a single motor unit could drive gear units 84 and 86.

In operation, the mechanism shown in FIG. 5 serves to raise workpiece 60 in its horizontal position where its elongate axis, defined by line B—B, remains substantially parallel to work surface 94. During operation, workpiece 60 is raised to a position shown by broken line 62, rotated, and then lowered to a position substantially identical with its initial position. When workpiece 60 is at rest at its lower most position in either its initial or rotated positions, it is secured in the horizontal plane by the cam followers and camming elements, and secured in the vertical plane by crank arms 80 and 82 to allow work to be performed thereon. More specifically, rotation of crank arms 80 and 82 is prohibited by motor and gear units 84 and 86 when these units are not in operation. Furthermore, the workpiece is secured in any raised, partially rotated, or partially lowered position to allow work operations to be performed thereon.

It will further be understood that in alternative embodiments, motor and gear units 84 and 86 may be driven by electric, pneumatic, or hydraulic means, for example.

Referring now to FIG. 6, yet another alternative embodiment comprises workpiece cradle 120 having dual cam followers (not shown) at one end engaging camming element 122, and ball bushing 124 at its other end. This embodiment operates in a manner substantially identical to that disclosed with respect to the embodiment shown in FIGS. 1 and 2, except that instead of the cam followers, crank arm and link assembly, and ball bushing being attached directly to workpiece 10, the workpiece is merely fastened to cradle 120 which itself has crank arm 128 and link 126, dual cam followers (not shown) and ball bushing 124 attached therefrom. Similar to the embodiment shown in FIGS. 1 and 2, this alternative embodiment secures the workpiece from movement to allow work operations to be performed thereon at any raised, rotated or lowered position.

Figure 8:
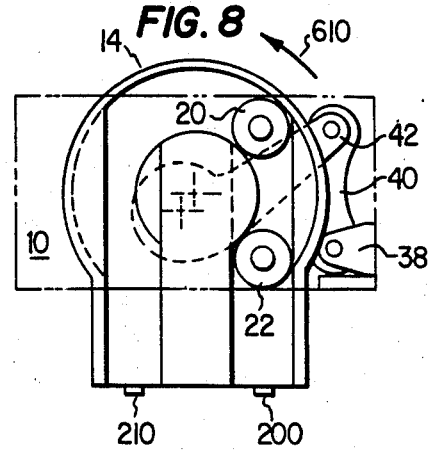
FIG. 8 is a sectional view along line 7—7 of FIG. 1 showing a workpiece in a raised and slightly rotated position.

Referring now to FIGS. 7 through 11, the sequential operation of raising, rotating and lowering a workpiece with the mechanism of the present invention is shown. Rotation of crank arm 42 causes link 40 and workpiece 10 to be raised until cam follower 20 is at the maximum limit of vertical motion defined by the beginning of the arcuate portion of camming race 30. At this point, as shown in FIG. 8, lower cam follower 22 enters the arcuate portion of race 32 and the workpiece begins to rotate as crank arm 42 is further rotated.

Figure 9:
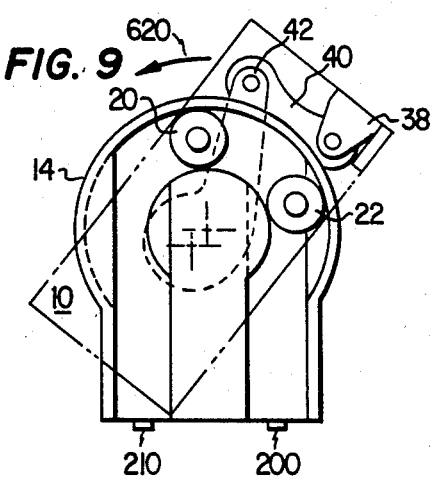
FIG. 9 is a sectional view along line 7—7 of FIG. 1 showing a workpiece in a raised and partially rotated position.
Figure 10:
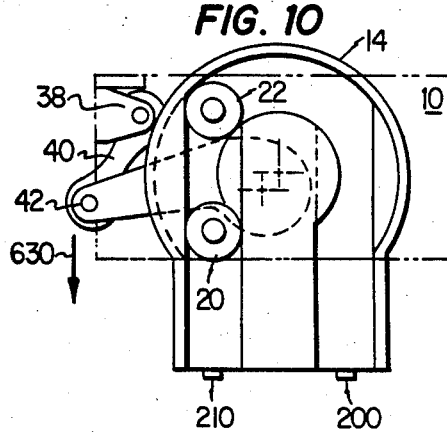
FIG. 10 is a sectional view along line 7—7 of FIG. 1 showing a workpiece in a raised and fully rotated position.
Figure 11:
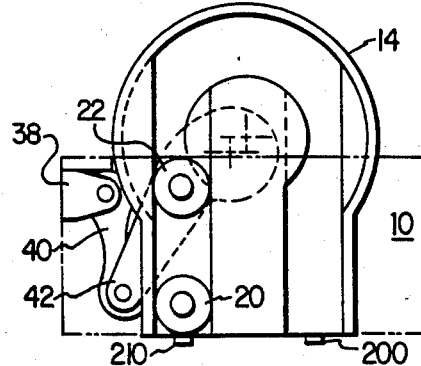
FIG. 11 is a sectional view along line 7—7 of FIG. 1 showing a workpiece in a fully rotated and lowered position.

As shown in FIG. 9, cam followers 20 and 22 engage the arcuate portions of camming races 30 and 32, respectively, allowing workpiece 10 to be rotated by crank arm 42. As shown in FIG. 10, workpiece 10 is in its fully rotated position where cam follower 20 engages the straight portion of camming race 30 and cam follower 22 traverses the straight portion of camming race 32. As crank arm 42 continues to rotate, workpiece 10 is lowered.

Thus, as is apparent from the above, the present invention provides an extremely uncomplicated indexing apparatus capable of providing reciprocal work transfer movement such as for indexing work pieces into and out of various raised, rotated and lowered positions. Specifically, among other things, the present invention provides a means for both raising, rotating and lowering a workpiece, and means to secure said workpiece to allow work to be performed thereon while said workpiece is in any position. Furthermore, the present invention provides means to control the movement of the workpiece throughout its travel to allow work to be performed thereon in any predetermined position.

Although preferred embodiments of the invention have been described in the foregoing Detailed Description and illustrated in the accompanying Drawings, it will be understood that the invention is not limited to the embodiments disclosed, but is capable of numerous rearrangements, modifications, and substitution of parts and elements without departing from the spirit of the invention. The present invention is therefore intended to encompass such rearrangements, modifications, and substitutions of parts and elements as fall within the scope of the invention.

I claim:

1. An apparatus for rotating a workpiece between a first and second position comprising:
   crank means for rotating a crank arm pivotally attached to the workpiece at a first end thereof;
   a first cam follower extending from said workpiece at said first end for engagement with a first camming race; and
   a second cam follower extending from said workpiece at said first end for engagement with a second camming race wherein said crank means, first cam follower, first camming race, second cam follower and second camming race cooperate to first lift said first end of the workpiece from said first position, rotate said workpiece, and then lower said first end of the workpiece to said second position.

2. The workpiece rotating apparatus of claim 1 further comprising:
   a ball bushing extending from a second end of the workpiece, and
   a pivotal support for receiving said ball bushing allowing said workpiece to rotate about its elongate axis and to change the inclination of its axis with respect to the horizontal.

3. The workpiece rotating apparatus of claim 1 wherein said crank means further comprises a link means connecting said workpiece and said crank arm.

4. The workpiece rotating apparatus of claim 3 further comprising:
   an extension connecting said link and said workpiece.

5. The workpiece rotating apparatus of claim 2 wherein said pivot support of said ball bushing is located in an elevated position so that said workpiece is inclined with respect to the horizontal in said first and second positions.

6. The workpiece rotating apparatus of claim 5 wherein the elevation of said pivot support is adjustable so that the inclination of said workpiece may be varied.

7. The workpiece rotating apparatus of claim 1 wherein said crank means, first cam follower, first camming race, second cam follower, second camming race and ball bushing further cooperate to secure said workpiece to allow work operations to be performed thereon.

8. The workpiece rotating apparatus of claim 7 wherein said crank means comprises a gear mechanism and drive means having a user operated on-off control means having an on position wherein said drive means is driven and an off position where said drive means is non-driven, said gear mechanism serving to prohibit rotation of said crank arm while said switch is in its off position.

9. The workpiece rotating apparatus of claim 8 wherein said drive means is reversible and said control means controls the direction of operation of said drive means.

10. The workpiece rotating apparatus of claim 9 wherein said drive means comprises an electric motor.

11. The workpiece rotating apparatus of claim 9 wherein said drive means comprises a pneumatic drive.

12. The workpiece rotating apparatus of claim 9 wherein said drive means comprises a hydraulic drive.

13. The workpiece rotating apparatus of claim 7 wherein the movement of said workpiece can be interrupted, and further comprising means to secure said workpiece in a partially or fully raised, partially or fully rotated, or partially lowered position to allow work operations to be performed thereon.

14. The workpiece rotating apparatus of claim 8 wherein said control means comprises means for detecting when said workpiece is in its fully lowered position and means for switching said control means to the off position when said workpiece reaches said fully lowered position.

15. An apparatus for rotating a workpiece having first and second ends between a first and second position comprising:
   (a) first crank means to rotate a first crank arm rotatably attached to said workpiece at said first end;
   (b) second crank means to rotate a second crank arm rotatably attached to said workpiece at said second end;
   (c) a first and second cam follower attached to said workpiece at said first end located to engage a first camming race and second camming race, respectively; and
   (d) a third cam follower and fourth cam follower attached to said workpiece at said second end located to engage a third camming race and fourth camming race, respectively, wherein said first and second crank means, first cam follower, second cam follower, first camming element, third cam follower, fourth cam follower, and second camming element cooperate to first to lift said workpiece in substantially a horizontal manner from said first position, rotate said workpiece, and then lower said workpiece to said second position.

16. The apparatus for rotating a workpiece of claim 15 wherein said first crank means further comprises a first link means connecting said workpiece and said crank arm; and said second crank means further comprises a second link means connecting said workpiece and said crank arm.

17. The workpiece rotating apparatus of claim 16 comprising:
   a first extension connecting said first link and the first end of said workpiece; and a second extension connecting said second link and the second end of said workpiece.

18. The workpiece rotating apparatus of claim 15 wherein said first crank means, first cam follower, first camming race, second cam follower, second camming race and said first crank means, third cam follower, third crank means, fourth cam follower and second camming race further cooperate to secure said workpiece to allow work operations to be performed thereon.

19. The apparatus for rotating a workpiece of claim 18 further comprising:
   first and second motors driving said first and second crank arms, respectively, wherein said first and second motors are reversible, and a control means to control the direction of said motors' operation so that said first and second crank arms are operated in unison at the same speed and in the same direction.

20. The apparatus for rotating a workpiece of claim 19 wherein said first crank means comprises a first gear mechanism driven by a first electric motor, and said second crank means comprises a second gear mechanism driven by a second electric motor, wherein said first and second electric motors have a user operated on-off control means, said first and second gear mechanisms serving to prohibit rotation of said first and second crank arms while said motor control means is off.

21. The apparatus for rotating a workpiece of claim 20 wherein said motor control means further has means for detecting when said workpiece is in its fully lowered position and means responsive to said detection means for operating said on-off control means when said workpiece reaches said fully lowered position.

22. An apparatus for rotating a workpiece mounted in a cradle, having first and second ends, between a first and second position comprising:
    (a) crank means for rotating a crank arm pivotally attached to said cradle at said first end;
    (b) a ball bushing attached to said second end of the cradle;
    (c) a bushing support for pivotally receiving said ball bushing;
    (d) a first cam follower attached to said cradle at said first end positioned to engage a first camming race; and
    (e) a second cam follower attached to said cradle at said first end positioned to engage a second camming race wherein said crank means, first cam follower, first camming race, second cam follower and second camming race cooperate upon operation of said crank means to first lift the first end of said cradle from said first position, rotate said cradle relative to said bushing support, and then translate said cradle to said second position.

23. An apparatus for rotating a workpiece between a first and second position comprising:
    crank means for rotating a crank arm pivotally attached to the workpiece at a first end thereof;
    a first cam follower extending from said workpiece at said first end for engagement with a camming race; and
    a second cam follower extending from said workpiece at said first end for engagement with said camming race, wherein said crank means, first cam follower, camming race, and second cam follower cooperate to first lift said first end of the workpiece from said first position, rotate said workpiece, and then lower said first end of the workpiece to a second position.

24. An apparatus for rotating a workpiece between a first and second position comprising:
    crank means for rotating a crank arm pivotally attached to the workpiece;
    a first cam follower extending from said workpiece for engagement with a first camming race; and
    a second cam follower extending from said workpiece for engagement with a second camming race wherein said crank means, first cam follower, first camming race, second cam follower and second camming race cooperate to first lift said workpiece from said first position, rotate said workpiece, and then lower said workpiece to said second position.

25. The workpiece rotating apparatus of claim 24 wherein said crank means further comprises a link means connecting said workpiece and said crank arm.

26. The workpiece rotating apparatus of claim 25 further comprising:
    an extension connecting said link and said workpiece.

27. The workpiece rotating apparatus of claim 24 wherein said crank means, first cam follower, first camming race, second cam follower, second camming race and ball bushing further cooperate to secure said workpiece to allow work operations to be performed thereon.

28. The workpiece rotating apparatus of claim 27 wherein said crank means comprises a gear mechanism and drive means having a user operated on-off control means having an on position wherein said drive means is driven and an off position where said drive means is non-driven, said gear mechanism serving to prohibit rotation of said crank arm while said switch is in its off position.

29. The workpiece rotating apparatus of claim 28 wherein said drive means is reversible and said control means controls the direction of operation of said drive means.

30. The workpiece rotating apparatus of claim 27 wherein the movement of said workpiece can be interrupted, and further comprising means to secure said workpiece in a partially or fully raised, partially or fully rotated, or partially lowered position to allow work operations to be performed thereon.

31. The workpiece rotating apparatus of claim 28 wherein said control means comprises means for detecting when said workpiece is in its fully lowered position and means for switching said control means to the off position when said workpiece reaches said fully lowered position.

* * * * *